Sept. 24, 1940.   L. C. GALLANT ET AL   2,215,785
RADIO DIRECTION FINDER
Filed Sept. 3, 1937   2 Sheets-Sheet 1
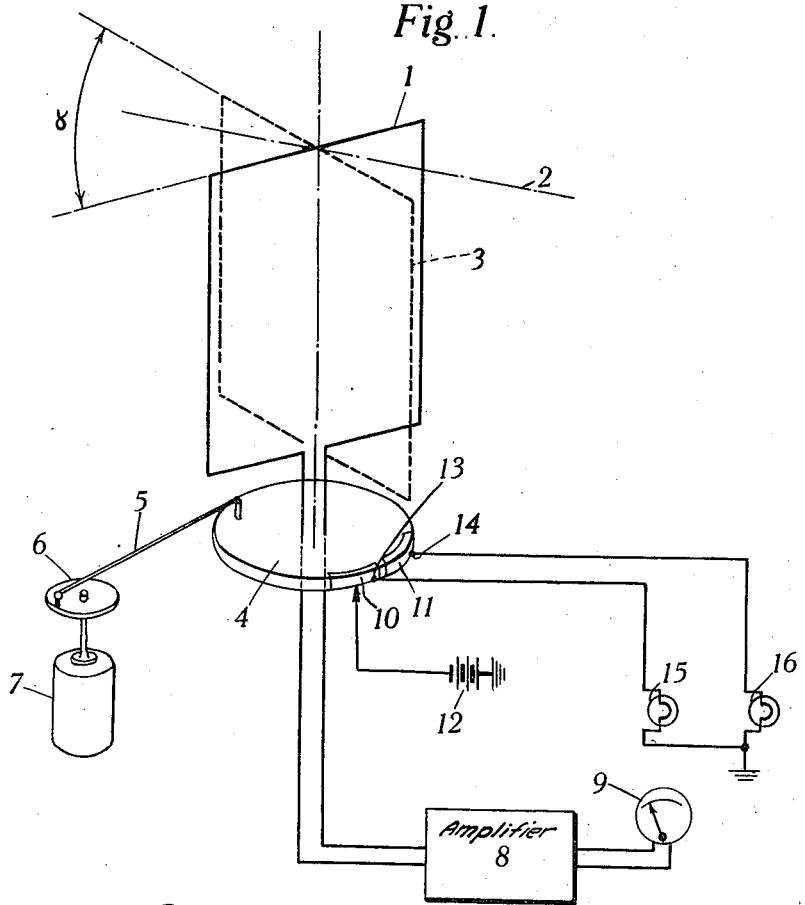
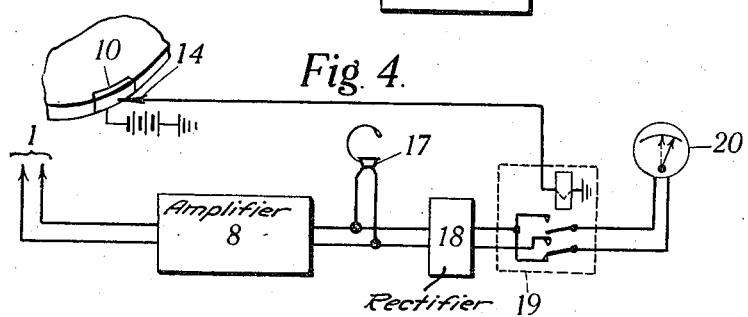
INVENTORS
L. C. GALLANT
C. NOUVELLON
BY
*E. D. Phinney*
ATTORNEY Sept. 24, 1940. L. C. GALLANT ET AL 2,215,785
RADIO DIRECTION FINDER
Filed Sept. 3, 1937 2 Sheets-Sheet 2

ANGULAR DISPLACEMENT OF LOOP

INVENTORS
L.C. GALLANT
C. NOUVELLON
BY
E. O. Phinney
ATTORNEY

Patented Sept. 24, 1940

2,215,785

UNITED STATES PATENT OFFICE 2,215,785

RADIO DIRECTION FINDER

Louis Charles Gallant and Camille Nouvellon, Paris, France, assignors to International Standard Electric Corporation, New York, N. Y.

Application September 3, 1937, Serial No. 162,278
In France October 24, 1936

3 Claims. (Cl. 250—11)

The present invention relates to devices sensitive to the direction of propagation of electromagnetic waves and in particular to devices which are used for direction finding on vehicles such as aeroplanes.

In accordance with certain of its characteristics, the invention provides radiogoniometers comprising devices for giving a direct indication on the moving vehicles of the actual direction of the transmitter.

The invention will be explained in greater detail in the following description based on the attached drawings, in which:

Fig. 1 represents an example embodying an automatic radiogoniometer particularly useful for indicating the direction of a vehicle with respect to a signal transmitter.

Fig. 4 represents a modified portion of the device of Fig. 1.

Figure 3:
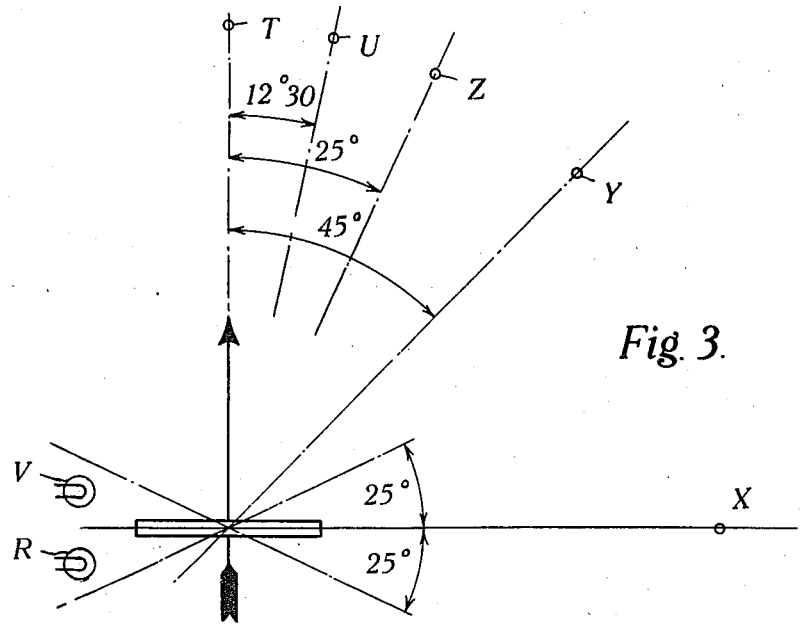
Figs. 2 and 3 are diagrams explaining the operation of the circuit shown in Fig. 1.

With reference to Fig. 1 an antenna 1 can oscillate about a direction line 2 between two positions 1 and 3 making between them an angle $\alpha$ determining the zone scanned by the goniometer. This antenna is mounted on an oscillating plate 4 which is held by means of a pin 5 fixed on an eccentric plate 6, whose movement is controlled by a suitable motor 7. The connecting conductors of the antenna 1 are connected to an amplifier 8 the low frequency output tube of which has in its anode circuit an indicator apparatus 9 which thus gives the variation of the electromagnetic field which crosses the frame when it is displaced. The plate 4 has on its circumference two arc segment conductors 10 and 11 supplied by a common battery or another suitable source 12. On these two segment conductors 10 and 11, two connections 13 and 14 engage these being respectively connected to the indicator lamps 15 and 16 which can be of different colours if desired. For example, one lamp may be green and the other red.

As already mentioned, the antenna oscillates between two extreme positions 1 and 3 under the action of the motor 7 through the intermediary of the plate 4. As the plate 4 oscillates, the two conductor segments 10 and 11 are alternately fed by the battery 12, one circuit being opened when the other is closed over one of the connections 13 or 14 and the corresponding indicator lamp 15 or 16. The lamps will then be alternately illuminated corresponding to whether the antenna is to the right or to the left of a plane which is perpendicular to the axis of the vehicle. These lamps may be placed behind a window, the opening or closing of which is controlled by the passage to zero of the indicator apparatus 9.

Figure 2:
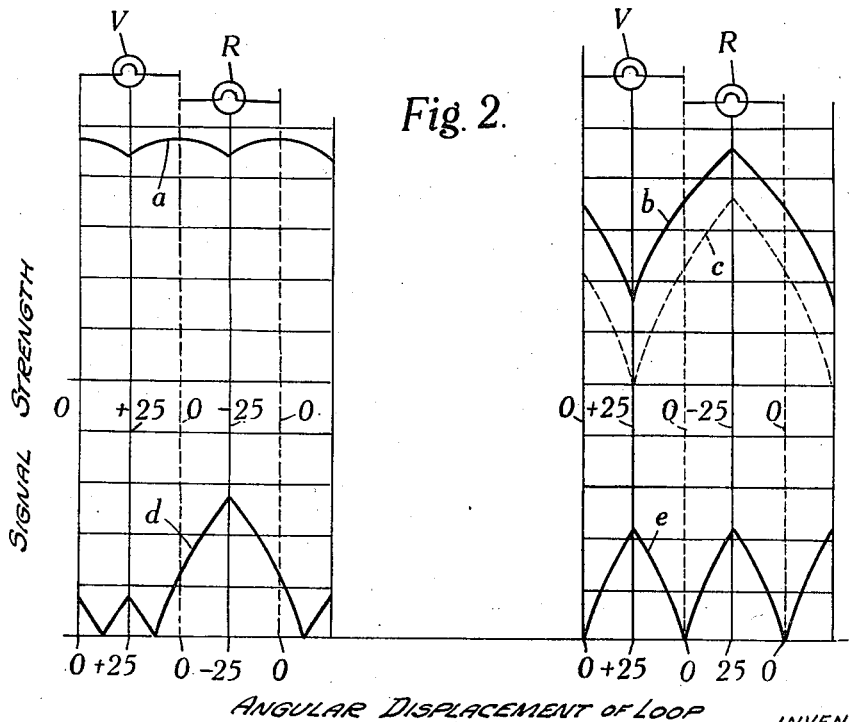

The indicator apparatus 9 which may be a meter device supplies an indication of the deflections which are continuously variable in proportion to the intercepted field. The indications given simultaneously by the meter 9 and lamps 15 and 16 combine as shown by the curves in Fig. 2 which represent in the ordinates, the deflections of the meter as a function of the continuous oscillation of the antenna frame on each side of the perpendicular, to the axis of the vehicle. These curves correspond to different positions of the transmitter radio station with relation to the vehicle. These positions are shown in Fig. 3.

Let us suppose for example that the antenna-frame is mounted on the vehicle in such a manner that the principal axis is perpendicular in the sense of the normal movement of the vehicle and that the angular displacement of the frame is 25° on each side.

If the radio station to which the system is tuned is at an angle of 90° from the vehicle (Fig. 3) for example at X, the intercepted field is maximum and the deflections of the indicator will vary little (curve $a$). To obtain a complete cycle one will have two maximum and two minimum amplitudes which differ little and the maxima will be observed at the moment when the indicator changes colour.

If the transmitting station is 45° at Y with relation to the principal axis, only a single maximum will be observed and a single minimum for the cycle (curve $b$). The maxima (or the minima) always take place for the same colour of the indicator system.

If the radio station is at 25° at Z always in relation to the same origin the same thing applies as in the foregoing, but the minima are zero (curve $c$).

If the radio station is at 12°30' at U, it will again be possible to observe two maxima and two zero minima per cycle (curve $d$), but the two maxima will have different amplitudes. Further, the maximum of the greatest amplitude is always produced for the same colour of the indicator system, that is the maximum and the two zero minima will coincide with the other colour.

Accordingly, if the transmitter station is at T exactly in the principal axis of the system, two maxima and zero minima per cycle (curve $e$) will be observed, but the maxima will have the same amplitude. These maxima each correspond to the same colour in the indicator system and the minima will be found to be zero at the moment when the colour changes.

In order to direct the vehicle towards a radio station, it will therefore be necessary to adjust the nose of the aeroplane in such a manner that the indicator shows deflections of the same amplitude separated by zero minima and further to show that these zero minima coincide with the change in colour of the lamp signalling system.

Fig. 4 shows a modification of a part of the device in Fig. 1, in which at the output of the amplifier 8, a receiver or headphone, 17, is mounted in parallel with a suitable current rectifier 18 output terminals of which are connected to a reversing switch 19 which controls an indicator apparatus 20, for example of the needle type. This reversing switch 19 is controlled by the current of a periodically-closed circuit across a conductor segment such as 10 and 11 in Fig. 1 or a brush such as 13 or 14. The needle apparatus 20 has a certain inertia of displacement with a view to reducing its deflection and its speed of balance whilst maintaining a suitable sensitivity of the indicator. The two indications which can be used are, therefore, the audible indication received in the headphone 17 and that given by the needle of the indicator apparatus 20.

Accordingly, with two successive amplitudes of the movement of the needle for the same value, the movable equipment of the indicator apparatus is submitted to two forces of opposing signs and rests at zero in consequence of its inertia. This is the case which arises when the transmitter is in the position T shown in Fig. 3, that is to say in the direction of the movement of the aeroplane. If the station is in a different position the mean values of two deflections are different and the needle is moved either to one side or the other of its normal position, indicating to the pilot the correction which he should make in his route.

Although the device which has just been described does not provide special means for removing the 180° ambiguity it will be understood that it is possible to use it in combination with any other antenna device in order to provide this facility error.

It is clear that the devices shown and described in the present memorandum are only by way of example and that other embodiments making use of the characteristics of the invention may also be envisaged without going beyond its domain.

What is claimed is:

1. A radio direction indicator of the homing type comprising a loop antenna pivotally mounted on an axis for receiving signals from a source, means for oscillating said loop through a predetermined angle, a detector amplifier coupled to said loop for detecting said received signals, an indicating means coupled to the output of said detector amplifier for indicating the amplitude of received signals, a plate carrying at least one commutator segment oscillated in timed relation with said loop and other indicating means cooperating with said segment for indicating the central position of said loop antenna with respect to its oscillating arc, said position indication cooperating with said first named indicating means for indicating the position of said loop relative to said source of signals.

2. A radio direction indicator according to claim 1, wherein said first named indicating device comprises a visual indicating meter.

3. A radio direction indicator of the homing type comprising a loop antenna pivotally mounted on an axis for receiving signals from a source, means for oscillating said loop through a predetermined angle, a detector amplifier coupled to said loop for detecting said received signals, an indicating meter coupled to the output of said detector amplifier for indicating the amplitude of received signals, a plate carrying commutator segments oscillated in timed relation with the oscillations of said loop, and other indicating means comprising a pair of lamps, and brushes connected to said lamps and engaging said commutator segments cooperating with said first named indicating means for indicating the position of said loop relative to said source of signals.

LOUIS CHARLES GALLANT.
CAMILLE NOUVELLON.